(12) United States Patent
Goto

(10) Patent No.: US 10,064,189 B2
(45) Date of Patent: Aug. 28, 2018

(54) WIRELESS COMMUNICATION SYSTEM AND WIRELESS COMMUNICATION DEVICE

(71) Applicant: Onkyo Corporation, Osaka (JP)

(72) Inventor: Yasuhiro Goto, Osaka (JP)

(73) Assignee: Onkyo Corporation, Osaka (JP)

( * ) Notice: Subject to any disclaimer, the term of this patent is extended or adjusted under 35 U.S.C. 154(b) by 0 days.

(21) Appl. No.: 15/678,968

(22) Filed: Aug. 16, 2017

(65) Prior Publication Data

US 2018/0063845 A1 Mar. 1, 2018

(30) Foreign Application Priority Data

Aug. 31, 2016 (JP) .................................. 2016-168711

(51) Int. Cl.
| | |
|---|---|
| *H04W 72/04* | (2009.01) |
| *H04W 24/02* | (2009.01) |
| *H04W 72/08* | (2009.01) |
| *H04W 52/02* | (2009.01) |

(52) U.S. Cl.
CPC ....... *H04W 72/0453* (2013.01); *H04W 24/02* (2013.01); *H04W 52/028* (2013.01); *H04W 72/08* (2013.01)

(58) Field of Classification Search
CPC . H04W 84/12; H04W 88/06; H04W 74/0816; H04W 76/023; H04W 74/006; H04W 88/08; H04W 40/12; H04W 52/0219; H04W 76/028; H04W 36/36; H04W 52/383; H04W 72/0453; H04W 24/02; H04W 72/08; H04W 52/028; H04B 7/04
See application file for complete search history.

(56) References Cited

U.S. PATENT DOCUMENTS

| | | | | |
|---|---|---|---|---|
| 6,813,498 | B1 * | 11/2004 | Durga ................... | H04W 68/00 340/568.1 |
| 2010/0110949 | A1 * | 5/2010 | Lundsgaard .......... | H04W 48/16 370/311 |
| 2015/0092608 | A1 | 4/2015 | Gossain | |
| 2017/0063665 | A1 * | 3/2017 | Casebolt ................ | H04L 43/16 |
| 2017/0188293 | A1 * | 6/2017 | Mizusawa ............. | H04W 48/16 |

FOREIGN PATENT DOCUMENTS

JP 2012-253807 12/2012

\* cited by examiner

*Primary Examiner* — Nizar Sivji
(74) *Attorney, Agent, or Firm* — Renner Otto Boisselle & Sklar, LLP

(57) ABSTRACT

To prevent occurring of cut of communication.

An AV center 2 includes a wireless communication section 22, a power supply section 25 that is for supplying power supply voltage to respective sections, and a microcomputer 21. A wireless speaker 3 includes a wireless communication section 32, a power supply section 35 that is for supplying power supply voltage to respective sections, and a microcomputer 31. The microcomputers 21 and 31 supply power supply voltage to the wireless communication sections 22 and 32 by the power supply sections 25 and 35 when the microcomputer 21 of the AV center 2 receives setting of power OFF of an audio playback system 1. And, the microcomputers 21 and 31 perform wireless communication and monitor a channel of the DFS band by the wireless communication sections 22 and 32.

7 Claims, 2 Drawing Sheets

WIRELESS COMMUNICATION SYSTEM AND WIRELESS COMMUNICATION DEVICE

BACKGROUND OF THE INVENTION

1. Field of the Invention

The present invention relates to a wireless communication system that uses DFS (Dynamic Frequency Selection) band and a wireless communication device.

2. Description of the Related Art

DFS band is wireless communication band of W53/W56 (15 ch to 29 ch) and is not busy band compared with W52 and 2.4 GHz generally. For this reason, occurring of cut of communication can be prevented by using DFS band. However, when DFS band is used, it is necessary that the following conditions (1) to (3) are met (for example, see JP 2012-253807 A.).
(1) If channel is monitored and it is not confirmed that interference does not exist for 1 minute before communication is started with channel within band, the channel cannot be used.
(2) When interference is detected after 1 minute monitor, movement from the channel must be performed immediately.
(3) When interference is radar for military affairs or weather, the channel cannot be used for 30 minutes.

In the wireless communication system in which wireless communication devices communicate wirelessly using DFS band, DFS band cannot be used at least for 1 minute after power ON of the wireless communication device because of above described monitoring. For this reason, communication is performed with busy band such as W52 band or 2.4 GHz band. Thus, it is highly possible that cut of communication occurs depending on radio wave environment. For example, when the wireless communication system is composed of the wireless communication device that sends an audio signal and the wireless communication device that receives the audio signal, it is highly possible that noise and cut of sound occur.

Further, after the wireless communication device is ON, movement to DFS band is performed after monitoring for 1 minute, power of the wireless communication device becomes OFF and result of monitor is cleared. For this reason, after the wireless device becomes ON, it is necessary to monitor for 1 minute and it is highly possible that cut of communication occurs at least for 1 minute. For example, when the wireless communication system is composed of the wireless communication device that sends an audio signal and the wireless communication device that receives the audio signal, it is highly possible that noise and cut of sound occur.

SUMMARY OF THE INVENTION

An objective of the present invention is to prevent occurring of cut of communication.

A wireless communication system of the present invention using DFS band and in which wireless communication devices performs wireless communication, wherein each of the wireless communication devices comprises a wireless communication section, a power supply section that is for supplying power supply voltage to respective sections, and a controller, the controllers supply power supply voltage to the wireless communication sections by the power supply sections when the controller of one wireless communication device receives setting of power OFF of the wireless communication system, and the controller of the one wireless communication device and the controller of the other wireless communication device perform wireless communication and monitor a channel of the DFS band by the wireless communication sections.

In the present invention, controllers supply power supply voltage to wireless communication sections by power supply sections when the controller of one wireless communication device receives setting of power OFF of a wireless communication system. And, the controller of the one wireless communication device and the controller of the other wireless communication device perform wireless communication and monitor DFS band by the wireless communication sections. Thus, after power of the wireless communication system becomes ON, wireless communication can be performed in DFS band with no congestion from the beginning without monitoring for 1 minute. Therefore, occurring of cut of communication is prevented.

Preferably, wherein the controller of the one wireless communication device sends an audio signal to the other wireless communication device by the wireless communication section, and the controller of the other wireless communication device receives the audio signal by the wireless communication section.

In the present invention, the controller of the one wireless communication device sends an audio signal to the other wireless communication device by the wireless communication section. Further, the controller of the other wireless communication device receives the audio signal by the wireless communication section. Therefore, after power of the wireless communication system becomes ON, sending and receiving of the audio signal can be performed in DFS band with no congestion from the beginning without monitoring for 1 minute. Thus, a user can hear clear audio because noise and cut of sound do not occur.

Preferably, wherein the other wireless communication device further comprises an amplifier that amplifies the audio signal, the controller of one wireless communication device sends cut off instruction to indicate to cut off supply of power supply voltage to the amplifier to the other wireless communication device by the wireless communication section when it receives setting of power OFF of the wireless communication system, and the controller of the other wireless communication device cuts off supply of power supply voltage to the amplifier by the power supply section when it receives the cut off instruction by the wireless communication section.

In the present invention, the controller of the one wireless communication device sends cut off instruction to indicate to cut off of supply of power supply voltage to an amplifier to the other wireless communication device by the wireless communication section when it receives setting of power OFF of the one wireless communication system. And, the controller of the other wireless communication device cuts off supply of power supply voltage to the amplifier by the power supply section when it receives the cut off instruction by the wireless communication section. Thus, when power of the wireless communication system becomes OFF, consumption power can be reduced by cutting off of supply of power supply voltage to the amplifier.

Preferably, wherein the controller of the one wireless communication device sends supply instruction to indicate to supply power supply voltage to the amplifier to the other wireless communication device by the wireless communication section when it receives setting of power ON of the wireless communication system, and the controller of the other wireless communication device supplies power supply voltage to the amplifier by the power supply section when it receives the supply instruction by the wireless communication section.

In the present invention, the controller of the one wireless communication device sends supply instruction to indicate to supply power supply voltage to the amplifier to the other wireless communication device by the wireless communication section when it receives setting of power ON of the one wireless communication system. And, the controller of the other wireless communication device supplies power supply voltage to the amplifier by the power supply section when it receives the supply instruction by the wireless communication section. Thus, when power of the wireless communication system becomes ON, power supply voltage is supplied to the amplifier and the amplifier can be a state that is able to amplify the audio signal.

Preferably, wherein the controller of the one wireless communication device receives setting of first standby mode that monitors the channel of the DFS band in case where power of the wireless communication system becomes OFF and second standby mode that does not monitor the channel of the DFS band in case where power of the wireless communication system becomes OFF, the controllers supply power supply voltage to the wireless communication sections by the power supply section when the controller of the one wireless communication device receives the setting of the first standby mode and it receives setting of power OFF of the wireless communication system, and the controllers do not supply power supply voltage to the wireless communication sections by the power supply section when the controller of the one wireless communication device receives the setting of the second standby mode and it receives setting of power OFF of the wireless communication system.

In the present invention, the controller of the one wireless communication device receives setting of first standby mode that monitors channel of DFS band in case where power of the wireless communication system becomes OFF and second standby mode that does not monitor channel of DFS band in case where power of the wireless communication system becomes OFF. Thus, the user can select any one of the first standby mode that monitors channel of DFS band and cut of communication does not occur from the beginning after power ON in case where power of the wireless communication system becomes OFF and the second standby mode that does not monitor channel of DFS band and consumption power is small.

According to the present invention, occurring of cut of communication is prevented.

DETAILED DESCRIPTION OF THE PREFERRED EMBODIMENTS

Figure 1:
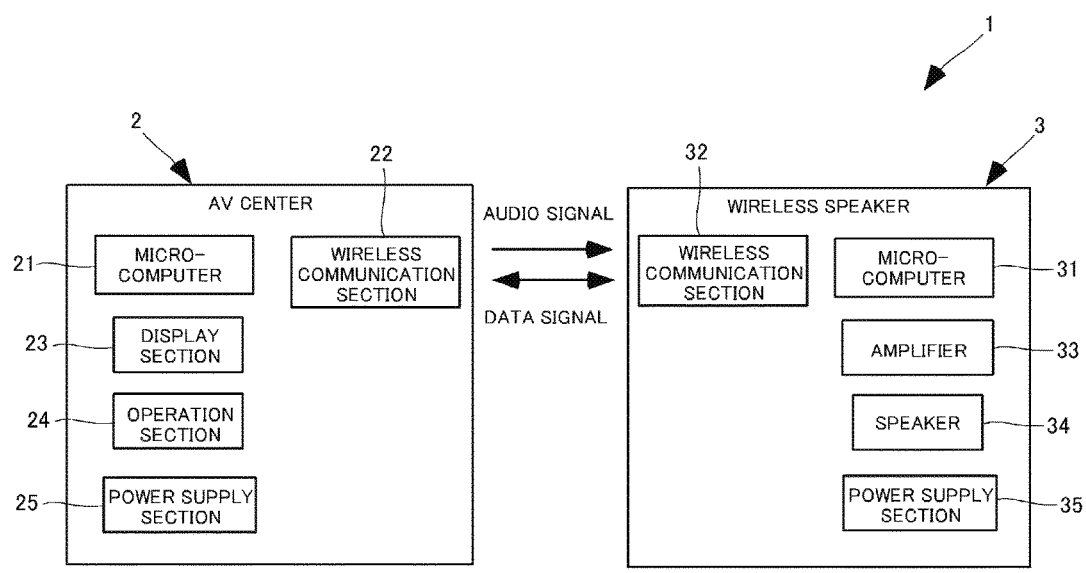
FIG. 1 is a block diagram illustrating a constitution of an audio playback system according to an embodiment of the present invention.

An embodiment of the present invention is described below. FIG. 1 is a block diagram illustrating a constitution of an audio playback system according to the present embodiment. The audio playback system 1 (wireless communication system) includes an AV center 2 (wireless communication device) and a wireless speaker 3 (wireless communication device). The AV center 2 and the wireless speaker 3 perform wireless communication. The AV center 2 sends an audio signal to the wireless speaker 3. The wireless speaker 3 receives the audio signal that is sent from the AV center 2 and plays back an audio.

(AV Center)

The AV center 2 includes a microcomputer 21, a wireless communication section 22, a display section 23, an operation section 24, and a power supply section 25. The microcomputer 21 (controller) controls respective sections composing the AV center 2. The wireless communication section 22 is for performing wireless communication with the other device. The microcomputer 21 performs wireless communication with the wireless speaker 3 by the wireless communication section 22. The microcomputer 21 sends the audio signal and a data signal to the wireless speaker 3 by the wireless communication section 22. Further, the microcomputer 21 receives the data signal from the wireless speaker 3 by the wireless communication section 22.

The display section 23 displays setting screen, volume level and so on. The display section 23 is composed of an LCD (Liquid Crystal Display), a vacuum fluorescent display and so on. The operation section 24 is for receiving user operation. The operation section 24 is composed of operation buttons that are provided at an enclosure of the AV center 2 and a remote controller. The power supply section 25 is for supplying power supply voltage to respective sections composing the AV center 2. The microcomputer 21 supplies power supply voltage to respective sections by the power supply section 25.

(Wireless Speaker)

The wireless speaker 3 includes a microcomputer 31, a wireless communication section 32, an amplifier 33, a speaker 34, and a power supply section 35. The microcomputer 31 (controller) controls respective sections composing the wireless speaker 3. The wireless communication section 32 is for performing wireless communication with the other device. The microcomputer 31 performs wireless communication with the wireless speaker 3 by the wireless communication section 32. The microcomputer 31 receives the audio signal from the AV center 2 by the wireless communication section 32. Further, the microcomputer 31 sends the data signal to the AV center 2 by the wireless communication section 32.

The amplifier 33 amplifies the audio signal that is received by the wireless communication section 32. The audio signal that is amplified by the amplifier 33 is output to the speaker 34. The speaker 34 plays back the audio based on the audio signal.

(Monitoring of Channel of DFS Band)

Monitoring of channel of DFS band in the audio playback system 1 is described below. The microcomputer 21 of the AV center 2 receives setting of first standby mode that monitors channel of DFS band when power of the audio playback system 1 becomes OFF and second standby mode that does not monitor channel of DFS band when power of the audio playback system 1 becomes OFF. A user can select the first standby mode or the second standby mode by the operation section 24 of the AV center 2.

Further, the microcomputer 21 receives setting of power OFF of the audio playback system 1. When the microcomputer 21 receives setting of power OFF of the audio playback system 1, it cuts off supply of power supply voltage to the display section 23 and so on by the power supply section 25 so as to set power supply of the AV center 2 to OFF state. Herein, when the microcomputer 21 receives setting of power OFF of the audio playback system 1, when it receives setting of the second standby mode, it cuts off supply of power supply voltage to respective sections including the wireless communication section 22 by the power supply section 25. Further, the microcomputer 21 sends cut off instruction that indicates to cut off supply of power supply voltage to respective sections to the wireless speaker 3 by the wireless communication section 22. When the microcomputer 31 of the wireless speaker 3 receives cut off instruction by the wireless communication section 32, it cuts off supply of power supply voltage to respective sections including the wireless communication section 32 by the power supply section 35 so as to set power supply of the wireless speaker 3 to OFF state.

When the microcomputer 21 receives setting of power OFF of the audio playback system 1, when it receives the setting of the first standby mode, it cuts off supply of power supply voltage to other than the wireless communication section 22 by the power supply section 25 so as to set power supply of the AV center 2 to OFF state. Therefore, the microcomputer 21 supplies power supply voltage to the wireless communication section 22 by the power supply section 25. Further, the microcomputer 21 sends cut off instruction that indicates to cut off supply of power supply voltage to other than the wireless communication section 32 by the wireless communication section 22 to the wireless speaker 3. When the microcomputer 31 receives cut off instruction, it cuts off supply of power supply voltage to other than the wireless communication section 32 by the power supply section 35 so as to set the wireless speaker 3 to OFF state. Therefore, the microcomputer 31 supplies power supply voltage to the wireless communication section 32 by the power supply section 35.

In case of the first standby mode, the microcomputers 21 and 31 perform wireless communication by the wireless communication sections 22 and 32, and monitor channel of DFS band.

Further, the microcomputer 21 receives setting of power ON of the audio playback system 1. When the microcomputer 21 receives setting of power ON of the audio playback system 1, it supplies power supply voltage to respective sections by the power supply section 25 so as to set power of the AV center 2 to ON state. Further, the microcomputer 21 sends supply instruction to indicate to supply power supply voltage to respective sections by the wireless communication 22 to the wireless speaker 3. When the microcomputer 31 of the wireless speaker 3 receives supply instruction by the wireless communication section 32, it supplies power supply voltage to respective sections by the power supply section 35 so as to set power supply of the wireless speaker 3 to ON state.

Figure 2:
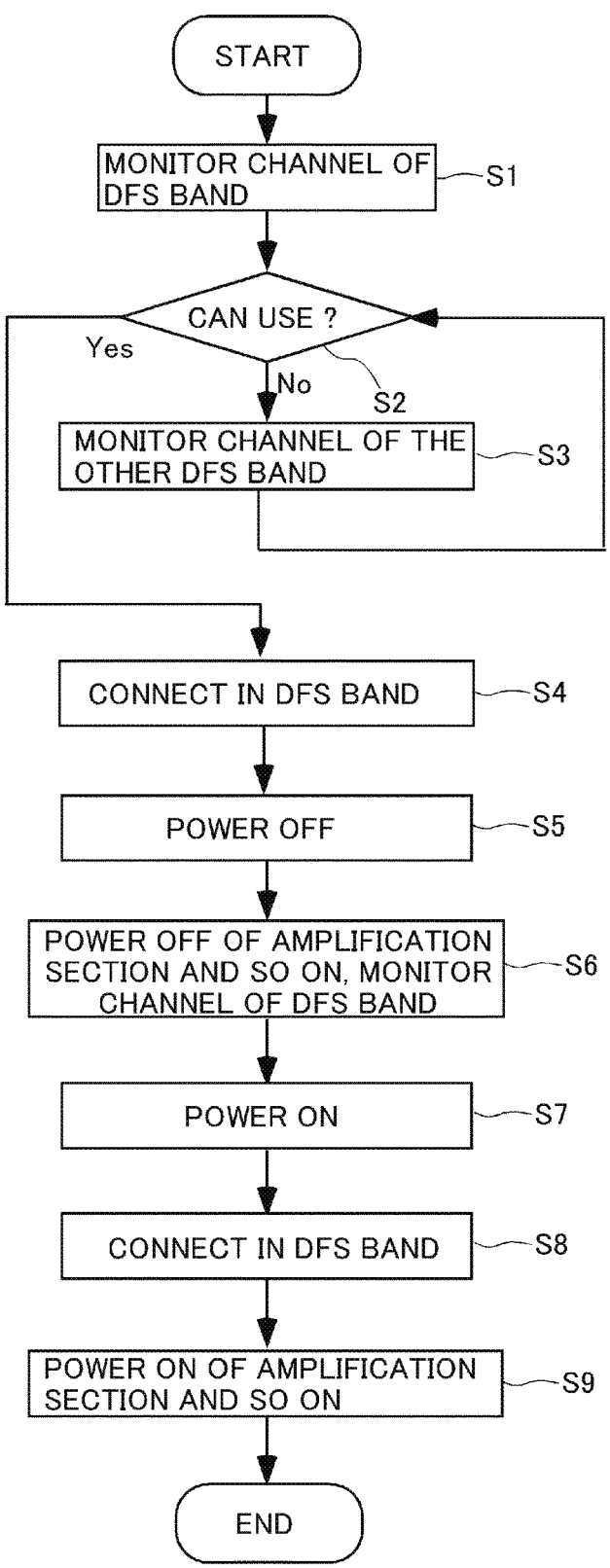
FIG. 2 is a flowchart illustrating monitoring of channel of DFS band in the audio playback system.

FIG. 2 is a flowchart illustrating monitoring of channel of DFS band in the audio playback system 1. As illustrated in FIG. 2, the microcomputer 21 of the AV center 2 receives setting of power ON of the audio playback system 1 first, the microcomputer 21 and the microcomputer 31 of the wireless speaker 3 monitor channel of DFS band by the wireless communication sections 22 and 32 for 1 minutes (S1). Next, the microcomputer 21 judges whether channel that is monitored can be used or not (S2). When the microcomputer 21 judges that channel that is monitored cannot be used (S2: No), the microcomputers 21 and 31 monitor the other channel of DFS band (S3). Next, the microcomputer 21 performs processing of S2.

When the microcomputer 21 judges that channel that is monitored can be used (S2: Yes), the microcomputers 21 and 31 connect with channel of DFS band that is monitored by the wireless communication sections 22 and 32 (S4). When the microcomputer 21 receives setting of power OFF of the audio playback system 1 (S5), when it receives the first standby mode, it cuts off supply of power supply voltage to other than the wireless communication section 22 by the power supply section 25 so as to set the AV center 2 to power OFF state. Further, the microcomputer 21 sends cut off instruction to indicate cut off supply of power supply voltage to other than the wireless communication section 32 to the wireless speaker 3. When the microcomputer 31 receives cut off instruction by the wireless communication section 32, it cuts off supply of the power supply voltage to other than the wireless communication section 32 by the power supply section 35 so as to set the wireless speaker 3 to power OFF state. Further, the microcomputers 21 and 31 monitor channel of DFS band by the wireless communications 22 and 32 (S6).

When the microcomputer 21 receives setting of power ON of the audio playback system 1 (S7), the microcomputers 21 and 31 connect in DFS band that is monitored by the wireless communication sections 22 and 32 (S8). Next, the microcomputer 21 supplies power supply voltage to respective sections by the power supply section 25 so as to set the AV center 2 to power ON state. Further, the microcomputer 21 sends supply instruction to indicate to supply power supply voltage to respective sections to the wireless speaker 3 by the wireless communication section 22. When the microcomputer 31 of the wireless speaker 3 receives supply instruction by the wireless communication section 32, it supplies power supply voltage to respective sections by the power supply section 35 so as to set power of the wireless speaker 3 to ON state (S9).

As described above, in the present embodiment, the microcomputers 21 and 31 supply power supply voltage to the wireless communication sections 22 and 32 by the power supply sections 25 and 35 when the microcomputer 21 of the AV center 2 receives setting of power OFF of the audio playback system'. And, the microcomputers 21 and 31 perform wireless communication and monitor the channel of the DFS band by the wireless communication sections 22 and 32. Thus, after power of the audio playback system' becomes ON, wireless communication can be performed in DFS band with no congestion from the beginning without monitoring for 1 minute. Therefore, occurring of cut of communication is prevented.

Further, in the present embodiment, the microcomputer 21 of the AV center 2 sends the audio signal to the wireless speaker 3 by the wireless communication section 22. Further, the microcomputer 31 of the wireless speaker 3 receives the audio signal by the wireless communication section 32. Therefore, after power of the audio playback system 1 becomes ON, sending and receiving of the audio signal can be performed in DFS band with no congestion from the beginning without monitoring for 1 minute. Thus, a user can hear clear audio because noise and cut of sound do not occur.

Further, in the present embodiment, the microcomputer 21 of the AV center 2 sends cut off instruction to indicate to cut off supply of power supply voltage to the amplifier 33 and so on to the wireless speaker 3 by the wireless communication section 22 when it receives setting of power OFF of the audio playback system 1. And, the microcomputer 31 of the wireless speaker 3 cuts off supply of power supply voltage to the amplifier 33 and so on by the power supply section 35 when it receives the cut off instruction by the wireless communication section 32. Thus, when power of the audio playback system 1 becomes OFF, consumption power can be reduced by cutting off supply of power supply voltage to the amplifier 33 and so on.

Further, in the present embodiment, the microcomputer 21 of the AV center 2 sends supply instruction to indicate to supply power supply voltage to the amplifier 33 and so on to the wireless speaker 3 by the wireless communication section 22 when it receives setting of power ON of the audio playback system 1. And, the microcomputer 31 of the wireless speaker 3 supplies power supply voltage to the amplifier 33 and so on by the power supply section 35 when it receives the supply instruction by the wireless communication section 32. Thus, when power of the audio playback system 1 becomes ON, power supply voltage is supplied to the amplifier 33 and the amplifier 33 can be a state that is able to amplify the audio signal.

Further, in the present embodiment, the microcomputer 21 of the AV center 2 receives setting of the first standby mode that monitors channel of DFS band in case where power of the audio playback system 1 becomes OFF and the second standby mode that does not monitor channel of DFS band in case where power of the audio playback system 1 becomes OFF. Thus, the user can select any one of the first standby mode that monitors channel of DFS band and cut of communication does not occur from the beginning after power ON in case where power of the audio playback system 1 becomes OFF and the second standby mode that does not monitor channel of DFS band and consumption power is small in case where power of the audio playback system 1 becomes OFF.

The embodiment of the present invention is described above, but the mode to which the present invention is applicable is not limited to the above embodiment and can be suitably varied without departing from the scope of the present invention.

In the above described embodiment, the audio playback system 1 in which the AV center 2 and the wireless speaker 3 communicate wirelessly, and send and receive the audio signal is illustrated as a wireless communication system. Not limited to this, the wireless communication system may be a wireless communication system in which wireless communication devices perform wireless communication.

The present invention can be suitably employed in a wireless communication system that uses DFS band and a wireless communication device.

What is claimed is:

1. A wireless communication system using dynamic frequency selection (DFS) band and in which wireless communication devices performs wireless communication,
wherein each of the wireless communication devices comprises a wireless communication section, a power supply section that is for supplying power supply voltage to respective sections, and a controller,
the controllers supply power supply voltage to the wireless communication sections by the power supply sections when the controller of one wireless communication device receives setting of power OFF of the wireless communication system,
the controller of the one wireless communication device which receives setting of power OFF of the wireless communication system sending a cut off instruction to the controller of the other wireless communication device that indicates to cut off supply of power supply voltage to other than the wireless communication section, and
the controller of the one wireless communication device and the controller of the other wireless communication device perform wireless communication and monitor a channel of the DFS band by the wireless communication sections.

2. The wireless communication system according to claim 1,
wherein the controller of the one wireless communication device sends an audio signal to the other wireless communication device by the wireless communication section, and
the controller of the other wireless communication device receives the audio signal by the wireless communication section.

3. A wireless communication system using dynamic frequency selection (DFS) band and in which wireless communication devices performs wireless communication,
wherein each of the wireless communication devices comprises a wireless communication section, a power supply section that is for supplying power supply voltage to respective sections, and a controller,
the controllers supply power supply voltage to the wireless communication sections by the power supply sections when the controller of one wireless communication device receives setting of power OFF of the wireless communication system, and
the controller of the one wireless communication device and the controller of the other wireless communication device perform wireless communication and monitor a channel of the DFS band by the wireless communication sections
wherein the controller of the one wireless communication device sends an audio signal to the other wireless communication device by the wireless communication section, and
the controller of the other wireless communication device receives the audio signal by the wireless communication section, and
wherein the other wireless communication device further comprises an amplifier that amplifies the audio signal,
the controller of one wireless communication device sends cut off instruction to indicate to cut off supply of power supply voltage to the amplifier to the other wireless communication device by the wireless communication section when it receives setting of power OFF of the wireless communication system, and
the controller of the other wireless communication device cuts off supply of power supply voltage to the amplifier by the power supply section when it receives the cut off instruction by the wireless communication section.

4. The wireless communication system according to claim 3,
wherein the controller of the one wireless communication device sends supply instruction to indicate to supply power supply voltage to the amplifier to the other wireless communication device by the wireless communication section when it receives setting of power ON of the wireless communication system, and
the controller of the other wireless communication device supplies power supply voltage to the amplifier by the power supply section when it receives the supply instruction by the wireless communication section.

5. The wireless communication system according to claim 1,
wherein the controller of the one wireless communication device receives setting of first standby mode that monitors the channel of the DFS band in case where power of the wireless communication system becomes OFF and second standby mode that does not monitor the channel of the DFS band in case where power of the wireless communication system becomes OFF, the controllers supply power supply voltage to the wireless communication sections by the power supply section when the controller of the one wireless communication device receives the setting of the first standby mode and it receives setting of power OFF of the wireless communication system, and the controllers do not supply power supply voltage to the wireless communication sections by the power supply section when the controller of the one wireless communication device receives the setting of the second standby mode and it receives setting of power OFF of the wireless communication system.

6. The wireless communication device comprising:
a wireless communication section;
a power supply section that is for supplying power supply voltage to respective sections;
and the controller,
wherein the controller supplies power supply voltage to the wireless communication section by the power supply section when the controller of one wireless communication device receives setting of power OFF of the wireless communication system, the controller sends a cut off instruction to a controller of an other wireless communication device that indicates to cut off supply of power supply voltage to other than a wireless communication section, and the controller of the one wireless communication device and the controller of the other wireless communication device perform wireless communication and monitor a channel of the DFS band by the wireless communication sections.

7. A wireless communication system using dynamic frequency selection (DFS) band and in which wireless communication devices performs wireless communication, wherein each of the wireless communication devices comprises a wireless communication circuit, a power supply circuit that is for supplying power supply voltage to respective sections, and a circuit, the circuits supply power supply voltage to the wireless communication circuits by the power supply circuits when the circuit of one wireless communication device receives setting of power OFF of the wireless communication system, the circuit of the one wireless communication device which receives setting of power OFF of the wireless communication system sending a cut off instruction to the circuit of the other wireless communication device that indicates to cut off supply of power supply voltage to other than the wireless communication section, and the circuit of the one wireless communication device and the circuit of the other wireless communication device perform wireless communication and monitor a channel of the DFS band by the wireless communication circuits.

* * * * *